United States Patent
Nonaka et al.

(10) Patent No.: US 6,308,014 B1
(45) Date of Patent: Oct. 23, 2001

(54) RANGING APPARATUS INSTALLED IN CAMERA

(75) Inventors: Osamu Nonaka, Sagamihara; Masataka Ide; Takeshi Kindaichi, both of Hachioji; Koichi Nakata, Kokubunji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/411,703

(22) Filed: Oct. 1, 1999

(30) Foreign Application Priority Data

Oct. 7, 1998 (JP) .................................. 10-285236
Aug. 20, 1999 (JP) .................................. 11-234077

(51) Int. Cl.[7] .............................. G03B 13/00; G03B 3/10
(52) U.S. Cl. ............................ 396/106; 396/98; 396/121
(58) Field of Search .............................. 396/96, 98, 102, 396/106, 108, 121, 123

(56) References Cited

U.S. PATENT DOCUMENTS

| | | | |
|---|---|---|---|
| 4,992,817 | * 2/1991 | Aoyama | 354/403 |
| 5,138,358 | * 8/1992 | Aoyama | 354/403 |
| 5,572,280 | 11/1996 | Yaji et al. | |
| 5,848,301 | * 12/1998 | Nonaka | 396/56 |
| 5,870,178 | * 2/1999 | Egawa | 356/3.03 |

FOREIGN PATENT DOCUMENTS

| | | |
|---|---|---|
| 54-051556 | 4/1979 | (JP) . |
| 62-148910 | 7/1987 | (JP) . |
| 7-98428 | 4/1995 | (JP) . |

* cited by examiner

Primary Examiner—Russell Adams
Assistant Examiner—Arthur A Smith
(74) Attorney, Agent, or Firm—Frishauf, Holtz, Goodman, Langer & Chick, P.C.

(57) ABSTRACT

A ranging apparatus according to the present invention can execute accurate focusing even when photography is performed in, for example, an environment in which the background of a main subject to be photographed is a night view. This accurate focusing is executed by performing two pre-integration operations, one with light projection and the other without light projection, then comparing signal patterns obtained by the two pre-integration operations to thereby select a partial area of a line sensor, which shows a difference between the signal patterns obtained by the comparison, and mainly using an output from this area as a signal for ranging. Further, this ranging apparatus performs pre-emission before the ranging operation, using the line sensor to set the ranging area of the apparatus substantially equal to an image area to be shot, thereby determining the position of the main subject in the image area to be shot. Thus, the ranging apparatus can select a desired subject without focus lock operations.

11 Claims, 15 Drawing Sheets

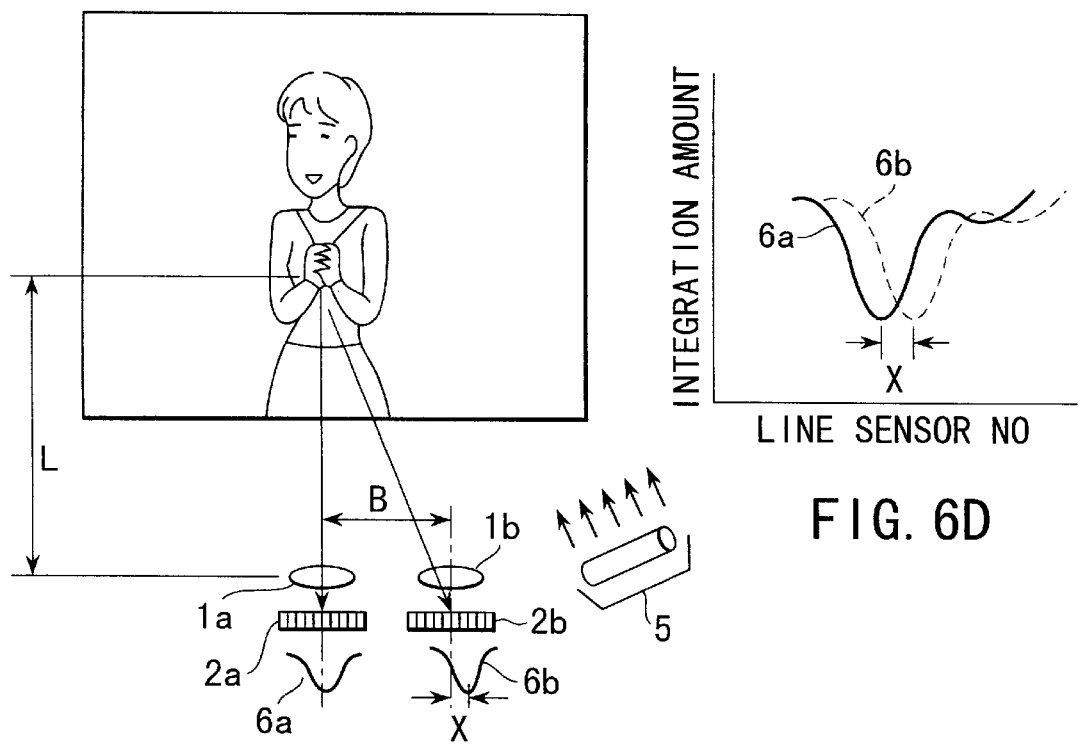
FIG. 6A
FIG. 6D
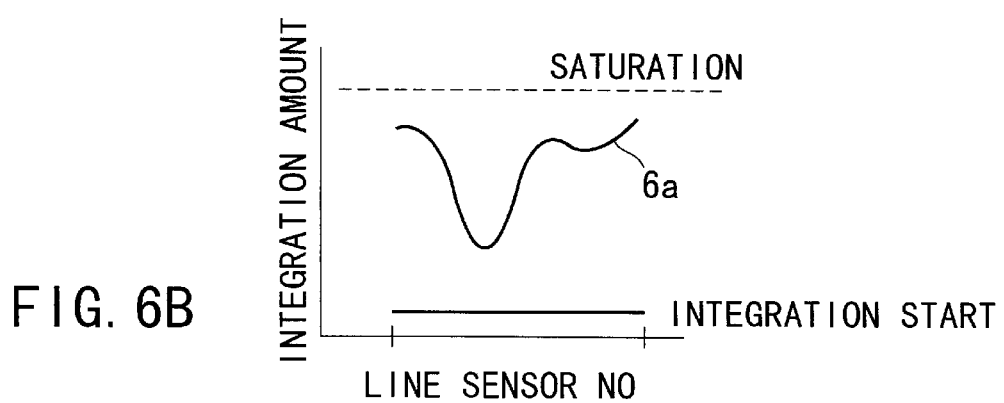
FIG. 6B
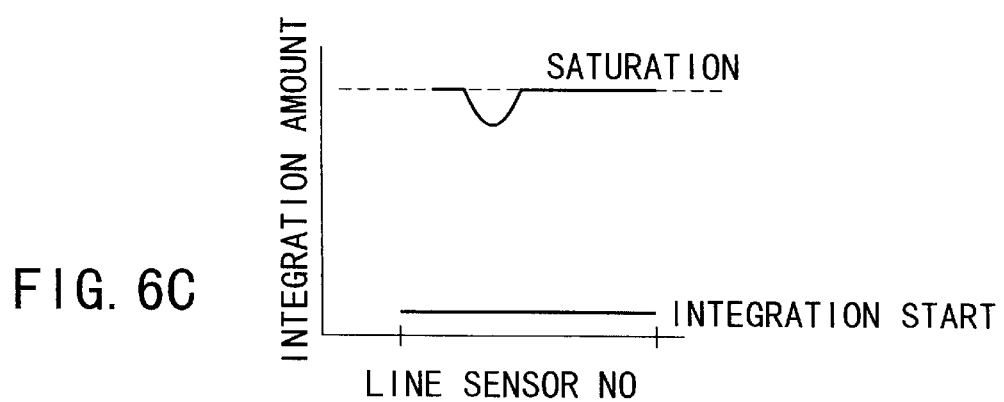
FIG. 6C

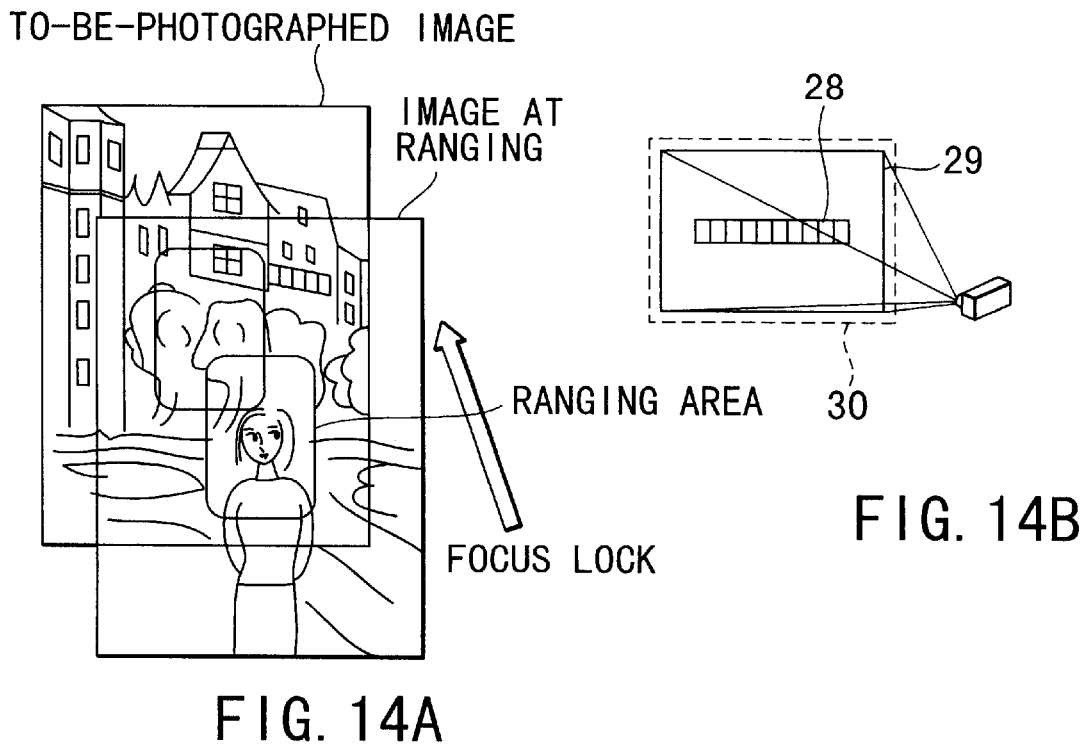
FIG. 14A
FIG. 14B
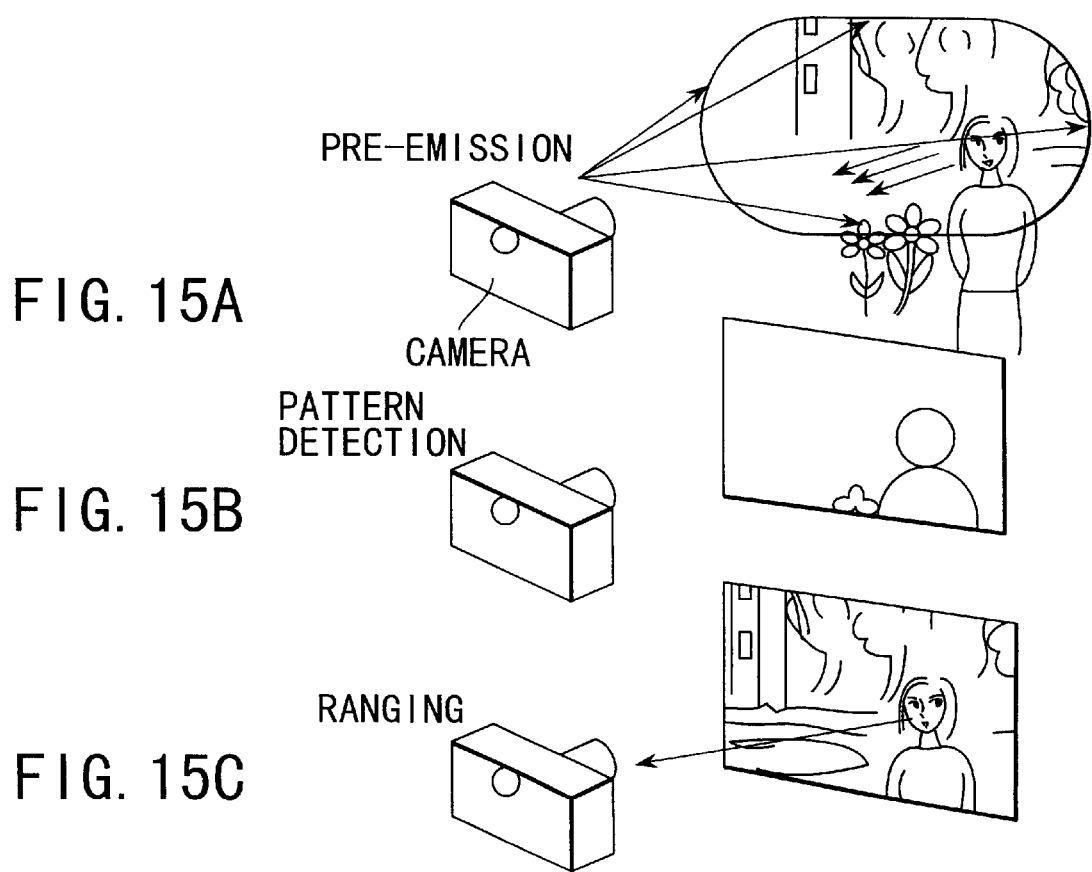
FIG. 15A
FIG. 15B
FIG. 15C

RANGING APPARATUS INSTALLED IN CAMERA

BACKGROUND OF THE INVENTION

This invention relates to a ranging apparatus installed in a camera and using an auto-focusing (AF) technique for focusing the camera on a subject.

In general, an image signal used for ranging is obtained by integrating a photoelectric current emitted from a line sensor. However, in order to make the resultant integration value fall within a dynamic range limited by the circuit scale of the camera, it is necessary to carefully change the integration finish time while monitoring the integration value.

For example, Japanese Patent Application KOKAI Publication No. 54-051556 discloses a technique for finishing the integration when the integration value has reached a predetermined value. Further, Japanese Patent Application KOKAI Publication No. 7-98428 filed by the same applicant as this application discloses a technique for estimating and determining the integration finish time on the basis of changes over time in integration value.

Moreover, Japanese Patent Application KOKAI Publication No. 62-148910 discloses a technique for performing ranging calculation not by determining the integration timing but by selecting signals obtained from a plurality of ranging areas that are defined by dividing an image area to-be-shot (composition).

When in the technique described in Japanese Patent Application KOKAI Publication No. 54-051556, the to-be-shot image in which a to-be-photographed subject exists is dark, the finish time of integration for ranging cannot be estimated and lots of time is required for integration, with the result that the moment for a good picture may be missed.

Contrary to Japanese Patent Application KOKAI Publication No. 54-051556, in Japanese Patent Application KOKAI Publication No. 7-98428, lots of time is required for, for example, estimation, and the integration amount may exceed the dynamic range of the circuit before the termination of the control, when the to-be-shot image in which a to-be-photographed subject exists is bright, i.e. the to-be-shot image has a high luminance, or when the integration processing must be quickly stopped as in a case where strong assisting light is emitted.

Referring to the characteristic and timing charts of FIG. 10 and the flowchart of FIG. 11, problems which may occur in the integration control will be described.

As is shown in FIG. 11, after starting the integration (step S31), monitoring is repeated until the integration value reaches an appropriate level (step S32). It is then determined in a step S33 whether or not the integration value has reached the appropriate level (step S33). When the appropriate level has been reached and it is determined that the integration should be finished, it is finished (step S34).

In the above-described integration system, the time (TH) necessary from the termination of the time (tM) during which monitoring is performed using A/D conversion, to the determination at the step S33 is indicated by charts as shown in FIG. 10.

Specifically, where the to-be-shot image has a high luminance at which the appropriate level is exceeded in a time earlier than (tM+TH), or where strong assisting light is emitted, the integration value cannot be made to be lower than the appropriate level, and inevitably exceeds the level. Further, when the to-be-shot image has a medium luminance, the integration value can be controlled appropriately, whereas when it has a low luminance, the shutter time lag required until the appropriate level is reached becomes longer and hence the moment for a good picture will be missed.

A ranging operation for improving the above problem will be described with reference to the flowchart of FIG. 13 and the timing chart of FIG. 12.

In this ranging operation, pre-integration processing is executed twice before the chief integration processing to estimate the time required for the chief integration processing.

First, pre-integration without light projection is started (step S41). After that, time counting is started (step S42), thereby performing integration till a time point t1 as shown in FIG. 12A (step S43) and taking the integration amount (A/D1) at the time point t1 (step S44).

Subsequently, the integration processing is continued (step S45), and the integration amount (A/D2) is taken at a time point t2 (step S46).

The integration amounts (A/D2) and (A/D1) are compared with each other, thereby determining whether or not A/D2 is large enough to reach a saturation level (step S47).

If the comparison result falls within a predetermined range (if the answer to the question at the step S47 is No), the time $t_{INT}$ required for the chief integration is determined from the amount of change (A/D2−A/D1) and the time difference Δt between the time points t1 and t2 (step S48).

Supposing that an appropriate integration level is Vs, the time required for the chief integration is given by the following equation (1), using the relationship $t_{INT}$: Vs=Δt: (A/D2−A/D1).

$$t_{INT}=\Delta t \cdot VS/(A/D2-A/D1) \tag{1}$$

The lower the luminance, the longer the integration time $T_{INT}$. In light of this, it is determined whether or not the integration time $t_{INT}$ is longer than a predetermined time that adversely affects photography (step S49). If the integration time $t_{INT}$ exceeds the predetermined time (if the answer to the question at the step S49 is Yes), it is replaced with a predetermined integration time $T_{INT1}$ (step S50).

The amount of integration stored during the pre-integration is reset (step S51), and the chief integration for ranging is started (step S52).

It is determined whether or not the set integration time $t_{INT}$ (or $T_{INT1}$) is reached (step S53). If the integration time is reached (if the answer is Yes), the chief integration is stopped (step S54), and the program proceeds to a routine for ranging that uses the obtained integration time.

If, on the other hand, the integration amount (A/D2) is too large (if the answer to the question at the step S47 is Yes) since the to-be-shot image has a high luminance as shown in FIG. 12B, the integration termination time t1 is changed to a shorter one, for example, t½ (step S55), thereby preventing saturation of the integration amount.

Accordingly, in the above-described ranging method, whether or not the time required for the chief integration is long can be estimated during the pre-ranging, with the result that the method is free from missing moments for good pictures, or from the out-of-focus state of a too bright subject.

Moreover, the time point t1 or t2 is not obtained using a monitor or a program, but is determined by a hardware timer. Thus, the time points are predetermined with high accuracy, which enables high-speed control.

However, when the to-be-shot image has a low luminance such as a night view image, the above ranging method forcibly shortens the integration time, which causes a similar effect to that obtained when the integration processing is stopped halfway. As a result, a case where the integration value does not reach the appropriate level may occur, thereby degrading the ranging accuracy.

In addition, a so-called multi AF system is also available, which has a plurality of ranging areas that enable focusing of the camera on a main subject for photography irrespective of the position of the subject in the viewer.

In this multi AF system, a technique for correctly determining the main subject and selecting the one of the ranging areas of the viewer, for which ranging should be performed, is important as well as a technique for controlling the amount of integration. This is because accurate focusing of the camera on the subject cannot be achieved if ranging is performed for a ranging area that does not correspond to the subject.

In a passive AF system as disclosed in Japanese Patent Application KOKAI Publication No. 62-148910, priority is imparted to contrast and accurate ranging is not performed for a subject of a low contrast. When, for example, a to-be-shot image as shown in FIG. 6A is photographed, the person as the main subject is out of focus since the background of the person has a higher contrast than the person.

BRIEF SUMMARY OF THE INVENTION

It is the object of the invention to provide a ranging apparatus which is free from the influence of a background on a to-be-photographed subject, i.e. which can perform ranging by determining the correct position of a to-be-photographed subject at a high speed without being influenced by the luminance of the subject or by the background even when performing ranging for night photography.

To attain the object, there is provided a ranging apparatus comprising: integration-type sensor means for receiving light reflected from a to-be-photographed subject situated in a ranging area, and outputting an image signal; monitor for monitoring an image signal level in a predetermined area of the integration-type sensor; light projecting section for projecting light onto the to-be-photographed subject; and operation control section having a pre-integration operation mode for synchronizing and operating the integration-type sensor and the light projecting section, and a main integration operation mode for obtaining ranging information, the operation control section setting the predetermined area on the basis of operation results in the pre-integration operation mode, thereby performing the main integration operation to calculate a distance to the to-be-photographed subject on the basis of an image signal used during the main integration operation.

Preferably, the operation control section compares, with each other, the operation results in the first and second pre-integration operation modes, thereby setting, as the predetermined area, an area in which a level difference between the operation results is a predetermined value or more. More preferably, an operation time for each of the first and second pre-integration operation modes is set shorter than an operation time for the main integration operation mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A is a view showing an example of a to-be-shot image;

FIGS. 6B, 6C and 6D are views showing patterns of integration amounts of the line sensor;

FIG. 14A is a view useful in explaining ranging performed using a focus lock function in a ranging apparatus according to a second embodiment;

FIG. 14B is a view showing the difference in ranging area between a line sensor and an area sensor;

FIGS. 15A, 15B and 15C are views useful in explaining the concept of the detection of a to-be-photographed main subject executed by the ranging apparatus of the second embodiment;

DETAILED DESCRIPTION OF THE INVENTION

Figure 1:
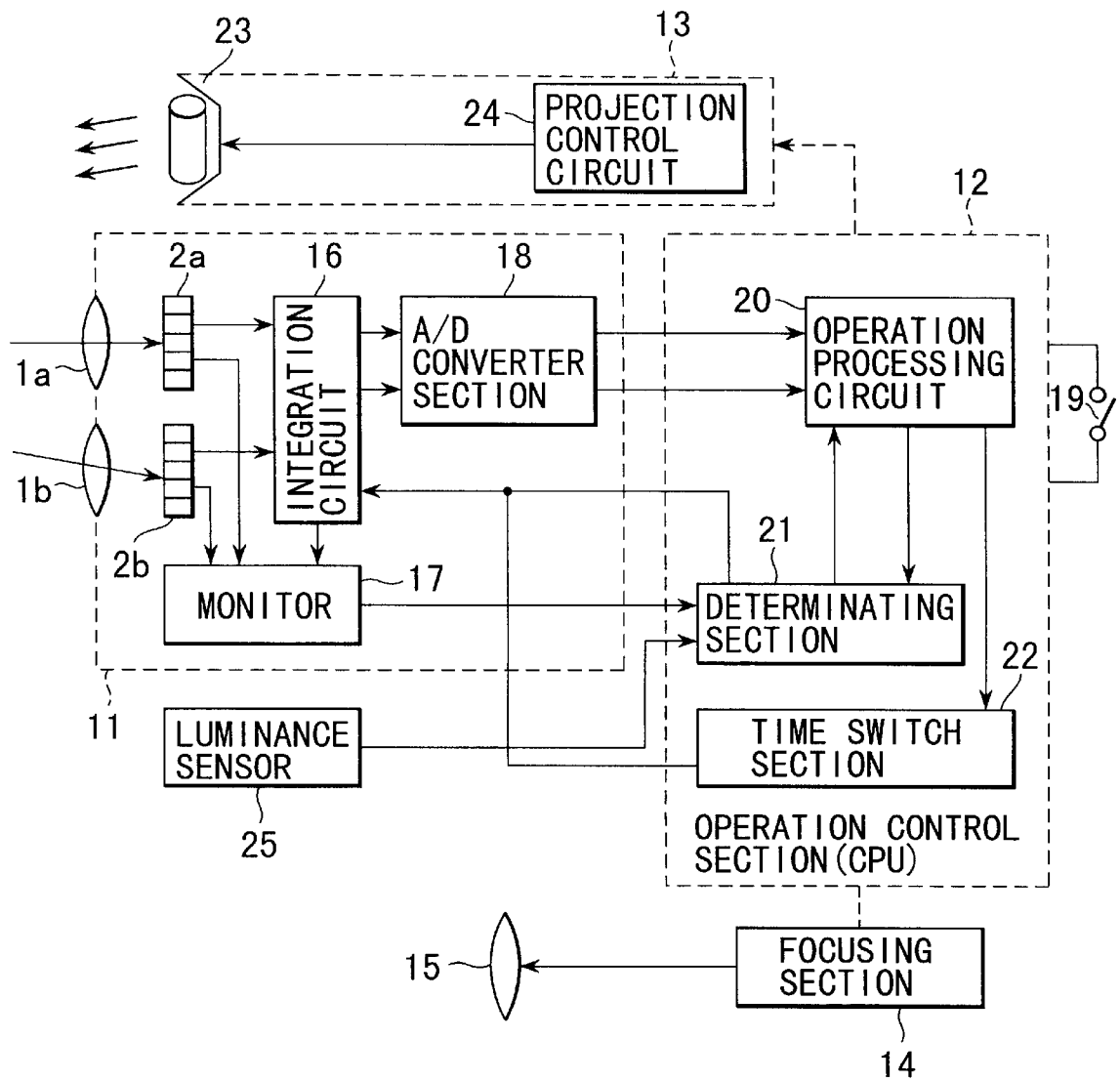
FIG. 1 is a view useful in explaining a ranging apparatus according to a first embodiment of the invention.

Reference will now be made in detail to the presently preferred embodiments of the invention as illustrated in the accompanying drawings.

Before describing a specific structure of each embodiment of the invention, the principle and outline of a ranging apparatus according to the invention, which uses a passive AF system, will be described with reference to FIGS. 6A to 6C.

FIG. 6A shows an example in which the actual distance L to a main subject 3, which is included in an image area to-be-shot 4, is measured. Ranging light is emitted from a light projector 5 to the main subject 3, and then light reflected from the subject 3 is converged by light receiving lenses 1a and 1b to form respective images of the subject 3. These images are projected onto line sensors 2a and 2b, respectively, which, in turn, output respective photoelectric signals (image signals 6a, 6b) corresponding to the luminance degrees of the images.

After each photoelectric signal is integrated for a predetermined period in time, a corresponding image signal 6a (or 6b) is obtained. Since the circuit for integration has a dynamic range determined by the power voltage or the circuit structure, it is necessary to set the integration wave (the integration amount of the image signal) within the range.

If, for example, integration is performed for a too long time or until a too much amount of integration is obtained, the outputs of most sensors are saturated, and accordingly the total information amount of image signals reduces as shown in FIG. 6C.

Concerning the image signals 6a and 6b in FIG. 6A, the distance L to the subject is given, on the basis of the principle of triangle ranging, by $$L = B \cdot f / x \quad (2)$$

where B represents the parallax between the lenses 1a and 1b, f represents the focal distance of the lenses, which causes a relative positional difference of x shown in FIG. 6A.

Accordingly, the accuracy, with which the images obtained by shifting, in calculation, the positions of the image signals 6a and 6b correspond to each other, leads to the accuracy of focusing, as is shown in FIG. 6D.

Therefore, in a state as shown in FIG. 6C in which the integration amount is not accurate, the focusing accuracy degrades. This disadvantage appears not only in the triangle ranging method but also in a contrast system using image signals.

Figure 7:
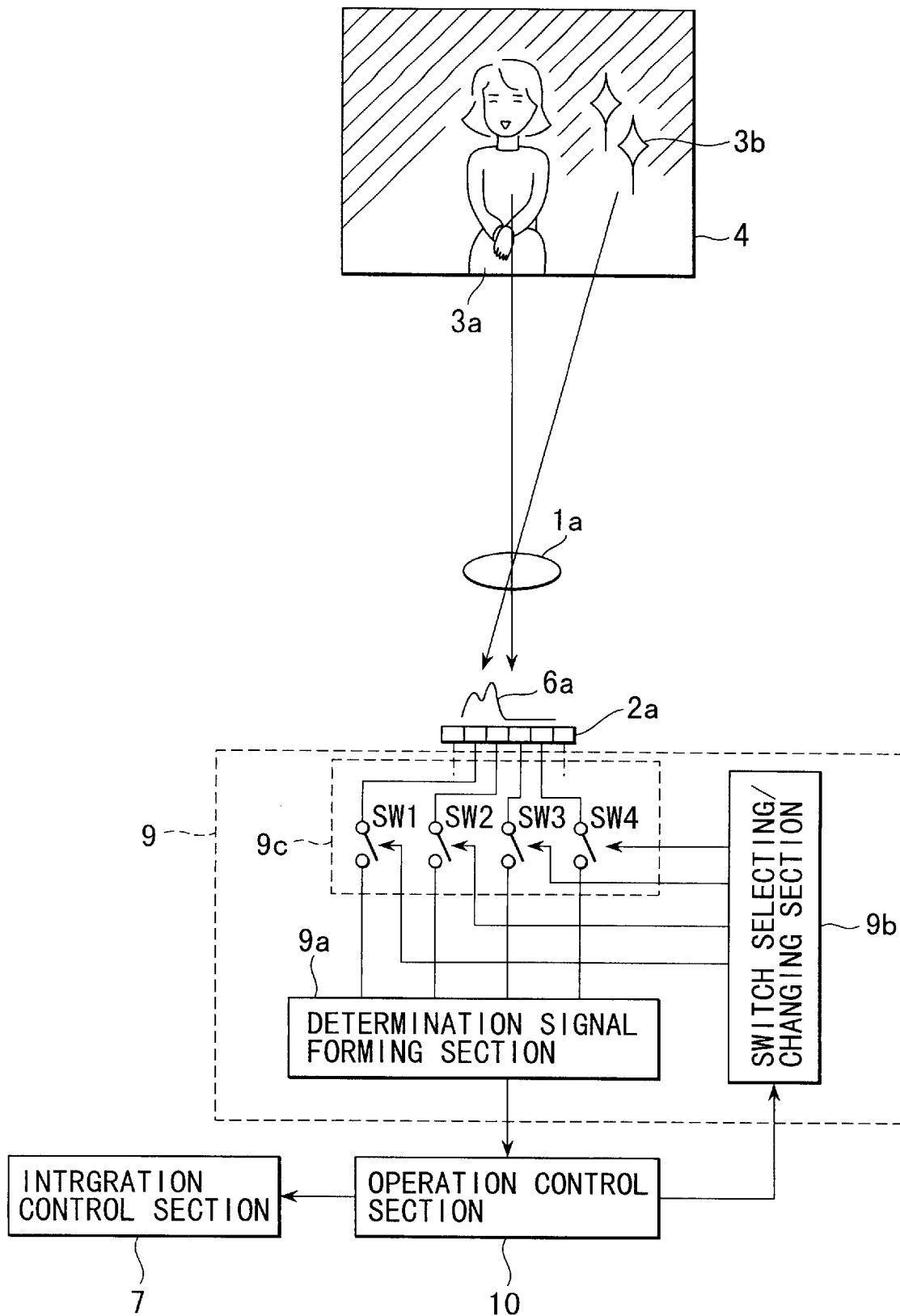
FIG. 7 is a view useful in explaining pre-integration performed without light projection in the ranging apparatus of the invention.

Further, in a night view image as shown in FIG. 7 in which a main subject (person) 3a is dark and bright light (for example, illumination) 3b exists in the background, the pattern of the image signal 6a obtained by ranging has a high contrast at a portion near the light in the background, and a low contrast at the main subject 3a. If in this case, the conventional ranging apparatus is used, it performs ranging using the contrast of the background light 3b, and hence the main subject 3a is out of focus.

Figure 8:
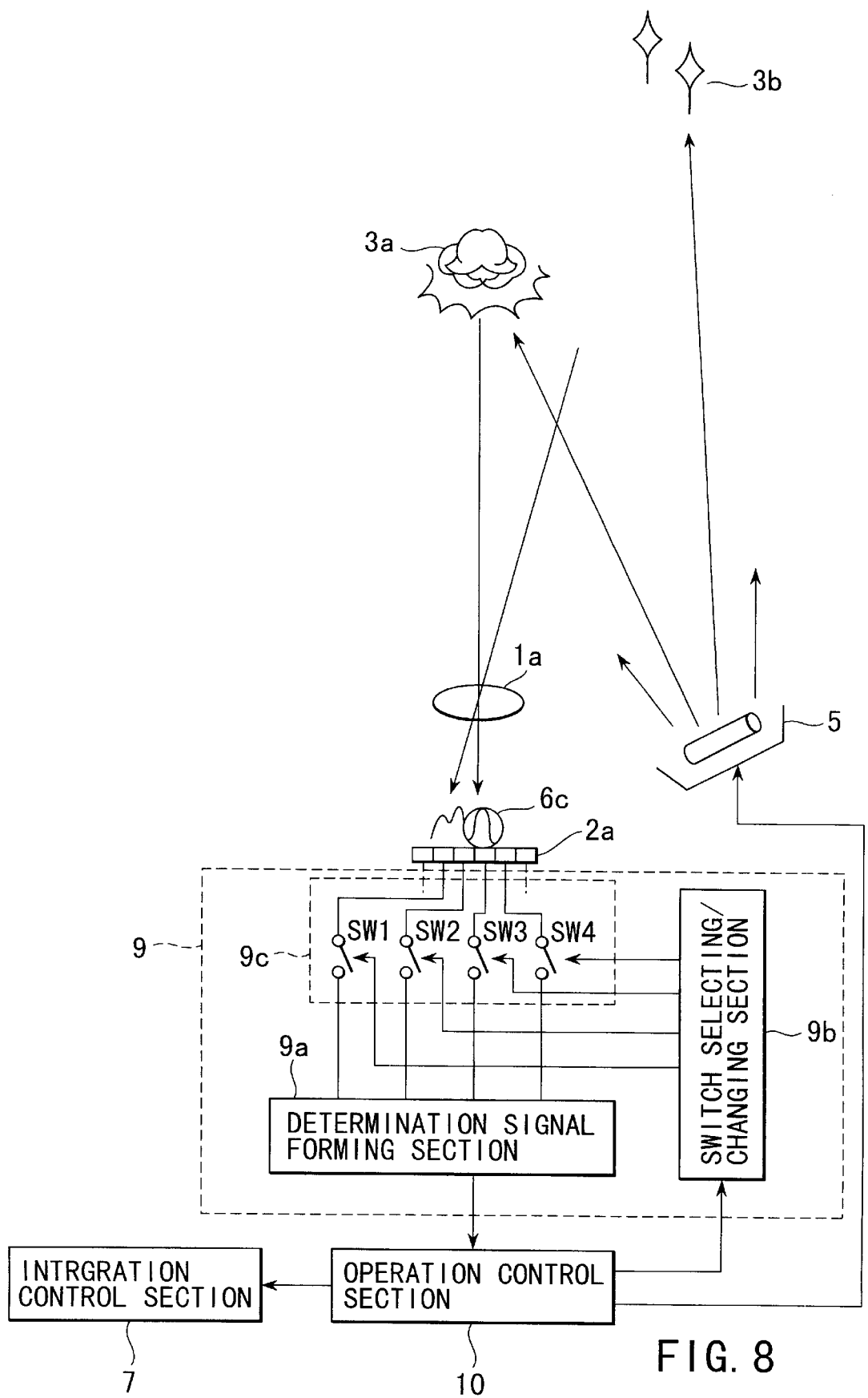
FIG. 8 is a view useful in explaining pre-integration performed with light projection in the ranging apparatus of the invention.

In the present invention, however, a monitor section 9, which is constituted of a switch group 9c, a switch selecting/changing section 9b, a determination signal forming section 9a, etc. as shown in FIGS. 7 and 8, is used to create a signal for grasping the integration amount for integration control, thereby preventing the ranging processing of an operation control section (CPU) 10 for integration amount control from being influenced by the background light. FIGS. 7 and 8 do not show an integration circuit.

More specifically, when switches SW1 and SW2 included in the switch group 9c are in the off state, a signal indicating the background light is not input to the determination signal forming circuit 9a that is incorporated in an integration monitor. In other words, it is important which one(s) of the switches 9c should be turned on or off. The influence of the background can be eliminated and the main subject 3a can be prevented from being out of focus by performing operations from integration control to ranging processing, using only a signal output from the line sensor section included in a sensor array 2a, which is used for detecting the main subject 3a.

In the present invention, the position of light obtained by reflecting light emitted from the light projector 5 is determined for the switch selection as shown in FIG. 8.

More specifically, before main integration processing for ranging, pre-integration processing is performed for a case where light is emitted from the light projector 5 and for a case where no light is emitted therefrom. Then, both the pre-integration results are compared with each other, and it is considered that the main subject 3a exists where the image signal is changed by the reflection signal.

Since the main subject (person) 3a is situated nearer than the background 3b, the light reflected from the main subject 3a has a much greater value than that reflected from the background.

Accordingly, the position of the main subject 3a can be accurately determined and the distance thereto can be measured, if an image pattern obtained without light projection is compared with that obtained with light projection, and if integration control or ranging operation is performed using an image signal detected from only that portion of the line sensor which shows a great output change.

Figure 9:
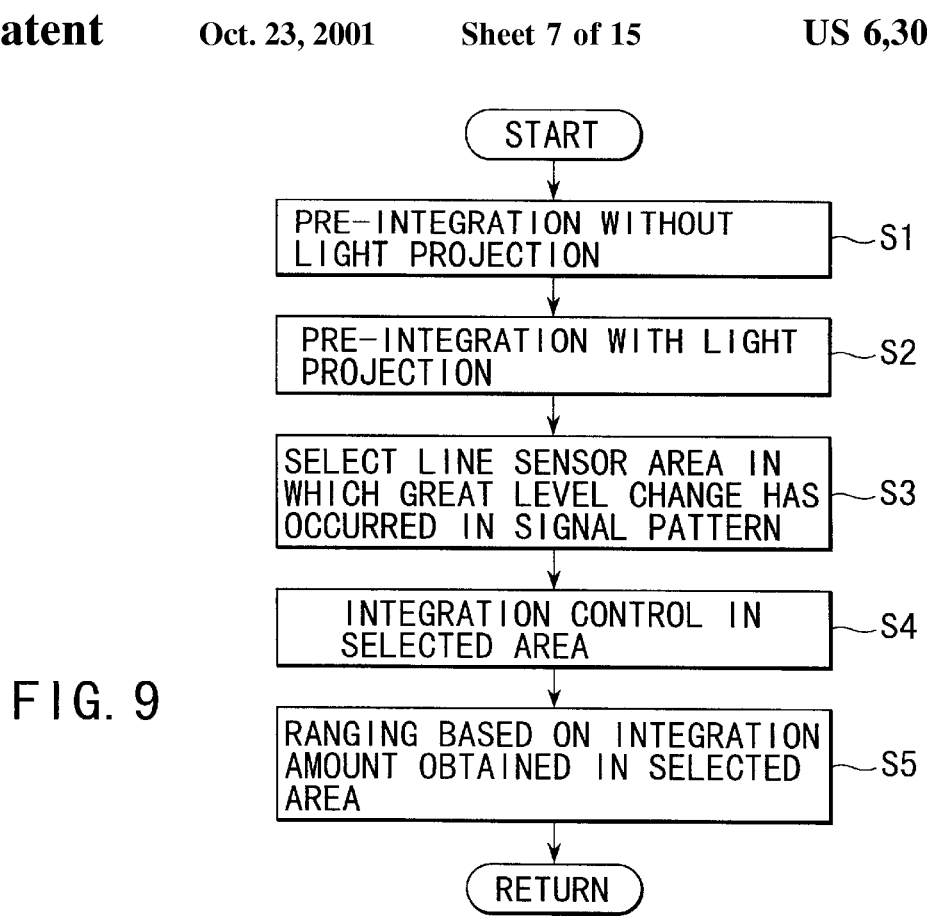
FIG. 9 is a flowchart for roughly explaining the ranging operation of the ranging apparatus of the invention.
Figure 10:
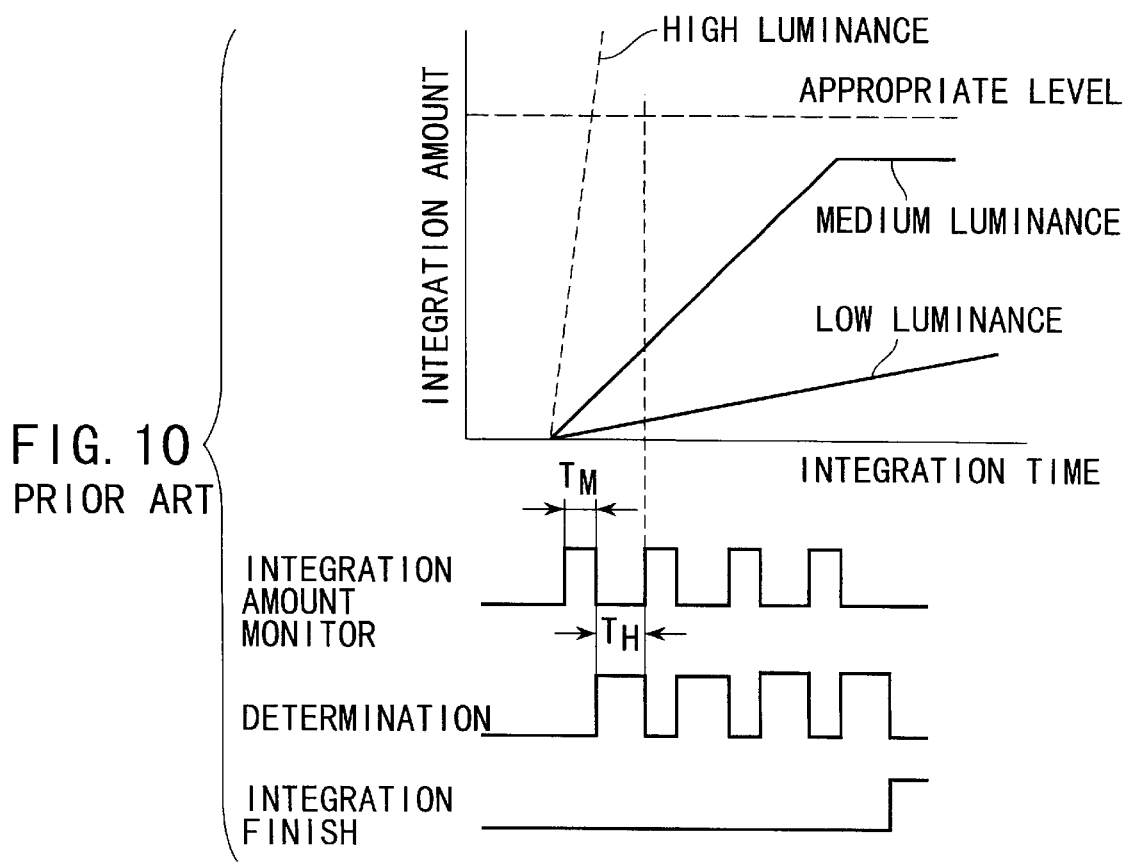
FIG. 10 is a view useful in explaining the conventional problem in ranging, showing the relationship between the luminance of the to-be-shot image, the integration amount and the integration finished time.
Figure 11:
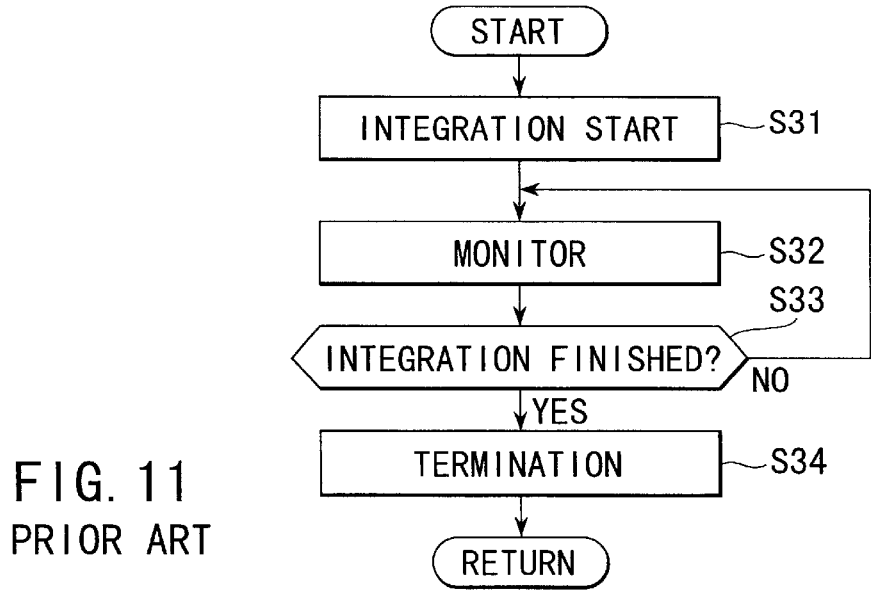
FIG. 11 is a flowchart for explaining conventional integration processing for ranging.
Figure 12A:
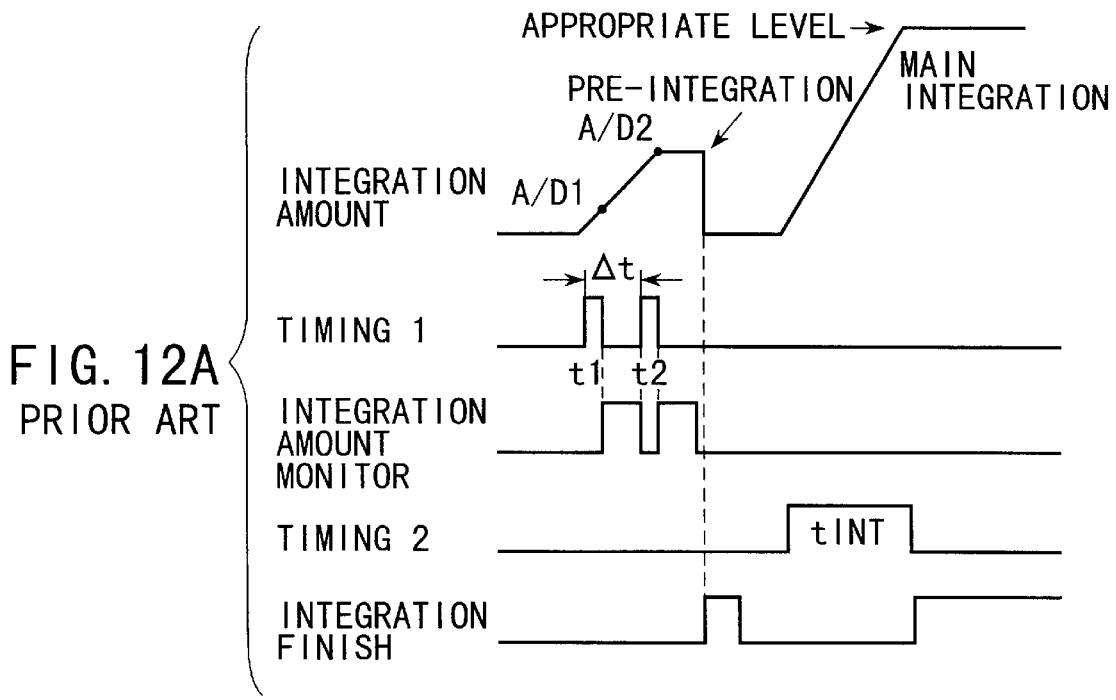
FIG. 12A is a timing chart for explaining the relationship between the integration amount and the timing in conventional ranging.
Figure 12B:
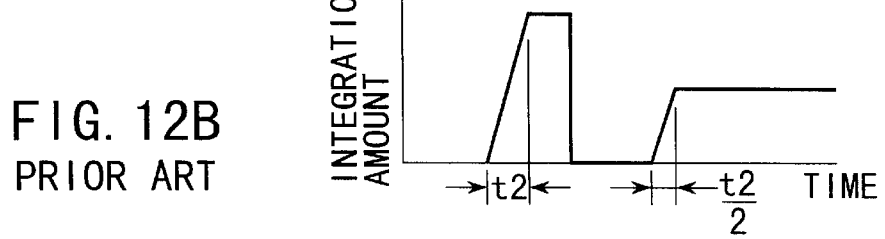
FIG. 12B is a view showing the relationship between the time and the integration amount.

Referring then to the flowchart of FIG. 9, the ranging processing of the present invention will be described.

Before starting the main integration processing for ranging, pre-integration processing is performed without lighting the light projector 5, to obtain an image signal 6a indicating the image pattern without light projection, as shown in FIG. 7 (step S1). Then, pre-integration processing is performed with the light projector 5 lighted, to obtain an image signal 6c indicating the image pattern with light projection, as shown in FIG. 8 (step S2).

The image signals 6a and 6c obtained by the two-stage pre-integration processing are compared with each other, thereby selecting the area of the line sensor which shows a greater change in the signal output therefrom (step S3). As aforementioned, the area of the line sensor which shows a significant change in the signal output therefrom is the area that receives light reflected from the main subject 3a.

The selection of the line sensor area that shows a significant change in signal is made by the above mentioned switches connected to the line sensor and on/off controlled by the switching section 9b.

Integration control is performed to obtain an integration signal from the selected line sensor area (step S4). After that, an image signal resulting from the integration processing is used for ranging performed by the CPU 10 (step S5).

As described above, if ranging is performed using an integration signal obtained only from the line sensor area aimed at the main subject, the camera can be focused on the main subject without being influenced by the background.

Referring back to FIG. 1, the ranging apparatus according to the first embodiment of the invention will be described in detail.

The ranging apparatus of the first embodiment mainly comprises a passive auto focusing section (hereinafter referred to an "AF section") 11, an operation control section (CPU) 12, a light projector 13 for emitting light onto a to-be-photographed subject, and a focusing section 14 for focusing a photographing lens 15.

The AF section 11 has the aforementioned light receiving lenses 1a and 1b and line sensors 2a and 2b, and also includes an integration circuit 16 for integrating the outputs of the line sensors 2a and 2b, a monitor 17 for monitoring, in a real-time manner, the integration result of the integration circuit 16 or the outputs of the line sensors, and an A/D converter section 18 for converting the integration result into a digital value. The A/D converter section 18 may be contained in the operation control section 12.

The operation control section 12 controls the operation sequence of the entire camera, and determines the starting time of ranging or photographing from the state of a switch 19 operated by the photographer.

The operation control section 12 comprises an operation processing section 20 for calculating, for example, the difference between the two image signals (6a and 6b shown in FIG. 6A) converted into digital values by the A/D converter section 18, thereby obtaining the focal position using the equation (2), a determination section 21 for determining the state of integration from the monitor output, and a time switching section 22 for creating predetermined points in time, using, for example, a counter.

The focusing section 14 comprises a driver, a position encoder, etc. for shifting the photographing lens 15 for focusing on the basis of a focusing signal output from the operation control section 12.

The light projector 13 comprises a strobe 23 for projecting assisting light toward a to-be-photographed subject, and a light projection control circuit 24 for controlling the strobe 23. This embodiment also incorporates a luminance sensor 25 for determining the exposure.

The ranging operation of the ranging apparatus constructed as above will now be described.

In this embodiment, a photography scene as shown in FIG. 7 is assumed, where the background of the main subject is, for example, a night view, and where erroneous ranging will easily occur depending upon the background contrast.

To determine in the scene whether or not the subject is of a low luminance, the luminance sensor 25 shown in FIG. 1 is used. If the main subject is not of a low luminance, it is considered that a sufficient contrast can be obtained even from the main subject, the flowchart of FIG. 13 can be used without changing it.

Figure 13:
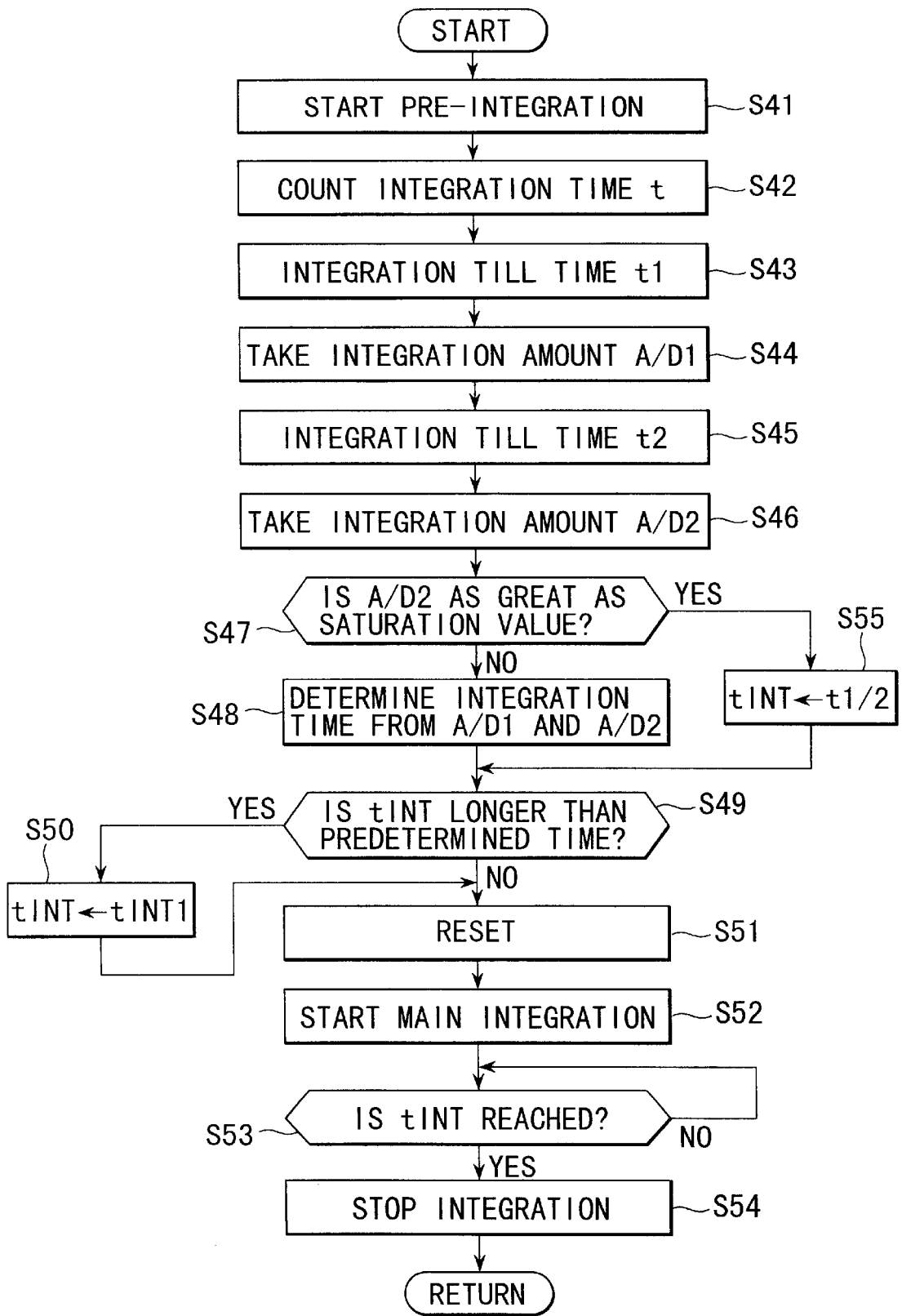
FIG. 13 is a flowchart useful in explaining a conventional integration method that is obtained by improving the integration method of FIG. 11.

In the FIG. 13 routine, it is necessary during two pre-integration operations to read data output from all sensors of the sensor array into the operation control section and to be compared with each other therein. Accordingly, time is required not only to transfer sensor data but also to perform difference comparison concerning all data items.

Figure 3A:
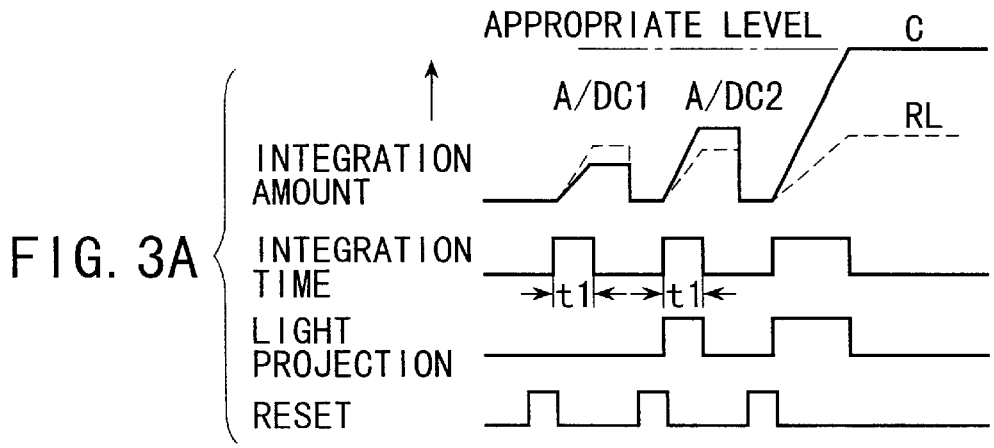
FIG. 3A is a timing chart for explaining integration processing performed in the apparatus of FIG. 1.
Figure 3B:
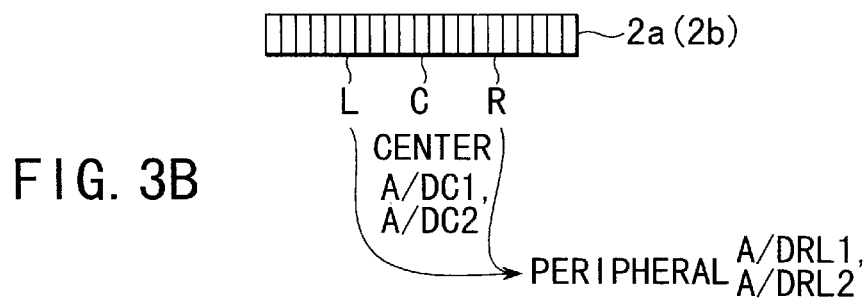
FIG. 3B is a view showing the areas included in a line sensor in which pre-integration is performed.

To avoid problems such as complicated and time-consuming calculations, etc., comparison is performed during the two pre-integration operations by selecting and using only those three of the sensors of the sensor array 2a, which are situated in typical positions, as is shown in FIG. 3B.

If, however, the sensing range is widened up to the endmost sensor of the sensor array 2a, where, for example, an object in an image area to-be-shot is situated at the end portion of the image which is nearest to the camera, the pattern of sensor data t output from a sensor area corresponding to the object changes most significantly between the first pre-integration operation with light projection and the second pre-integration without light projection. Accordingly, the camera is focused on the object as a main subject. However, in general, the main subject is not situated at an end of the image area to-be-shot.

In light of this, a left-hand sensor L and a right-hand sensor R, included in the sensor array 2a shown in FIG. 3B and adapted to output a monitor signal, are arranged in positions in which they do not sense peripheral portions of the to-be-shot image.

Figure 5:
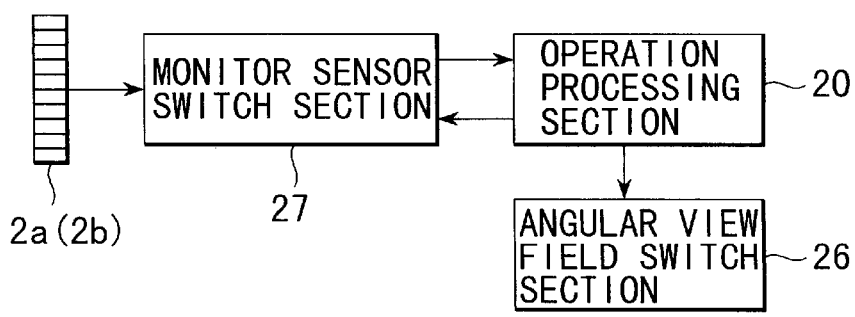
FIG. 5 is a view showing an example of a structure for selecting a sensor area corresponding to an image angle.

A camera having a variable photography range, such as a camera with a panorama function, a camera with a zoom lens, etc. may be constructed such that an image angle switching section 26 and a monitor sensor switching section 27 are employed as shown in FIG. 5, thereby enabling appropriate switching of the sensor area, which is to be detected by the operation control section 20, in accordance with a switched image area to-be-shot.

Figure 2:
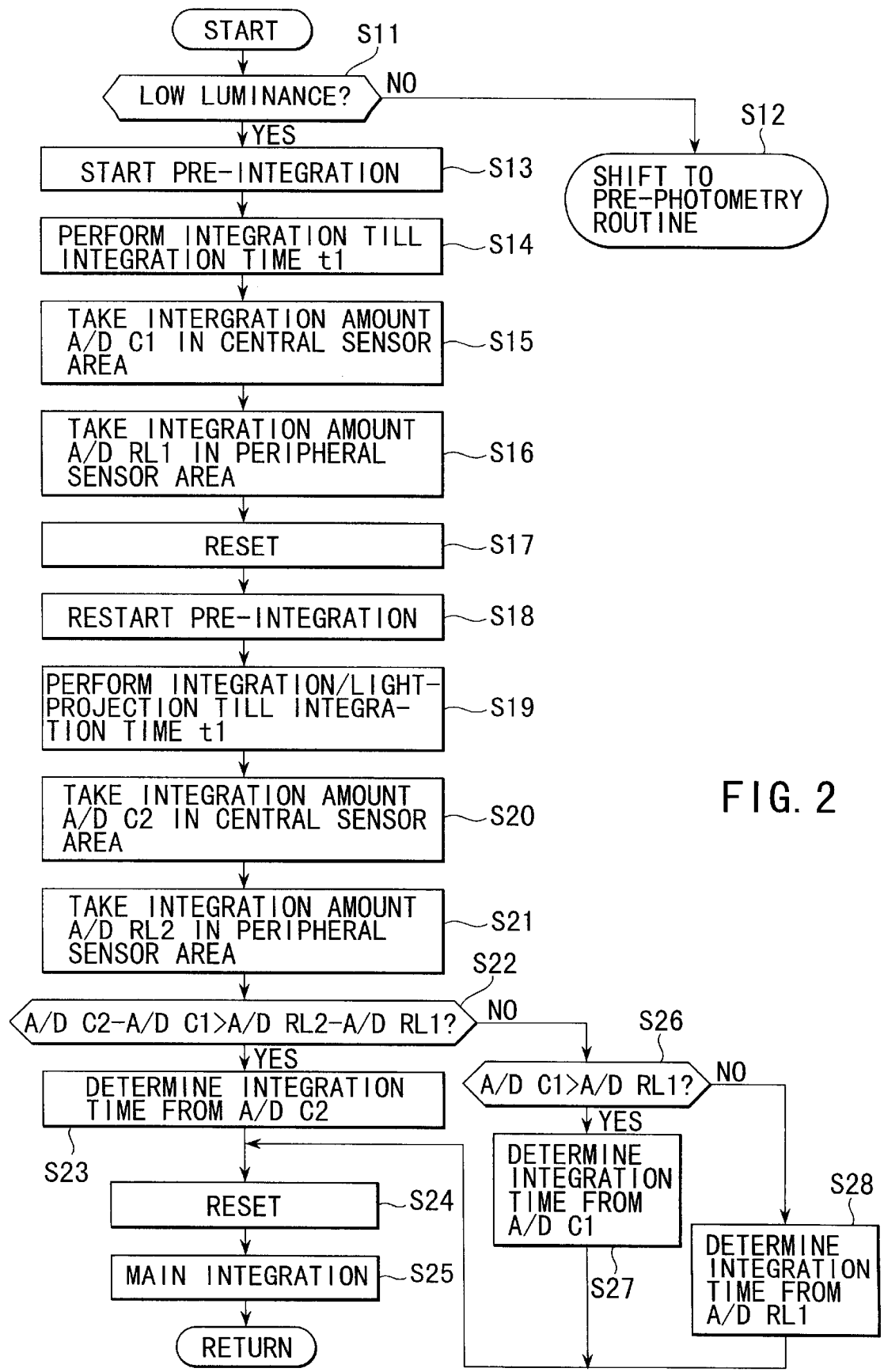
FIG. 2 is a flowchart for explaining the ranging operation of the apparatus of FIG. 1.

Referring then to the flowchart of FIG. 2, the ranging operation of the first embodiment constructed as shown in FIG. 1 will be described.

First, it is determined whether or not the to-be-shot image that includes a to-be-photographed subject has a low luminance (step S11). If it is determined that it does not have a low luminance, i.e. if the answer to the question is No, it is considered that it has a high or medium luminance. Accordingly, pre-integration is performed without light projection to calculate the time required for the main integration, and the integration time is obtained using the routine of FIG. 13 (step S12).

Whenever performing pre-integration, light projection may be performed. In this embodiment, however, light projection is performed only when the to-be-shot image has a low luminance, whereas light projection is not employed when the luminance is medium or high. This is because light projection performed whenever pre-integration is executed leads to waste of power. Selective light projection contributes to power saving.

If it is determined at the step S11 that the luminance is low (if the answer is Yes), first integration is started without light projection (step S13).

The integration is performed for a predetermined pre-integration time period t1 (step S14), thereby causing the operation processing section 20 to take a pre-integration amount (A/D C1) obtained by a central sensor C (step S15), and then to take a larger one (A/D RL1) of pre-integration amounts obtained by the left-hand and right-hand sensors L and R (step S16). Thus, a larger one of the pre-integration amounts obtained by the peripheral sensors L and R is selected by an analog circuit.

The operation control section 20 first stores the pre-integration amounts in a storage thereof, and then resets the pre-integration amount accumulated so far in the sensors (step S17).

After that, the second integration, in which light projection is used, is started (step S18).

The integration is performed for the predetermined pre-integration time period t1 (step S19), thereby causing the operation control section 20 to take a pre-integration amount (A/D C2) obtained by the central sensor C (step S20), and then to take a larger one (A/D RL2) of pre-integration amounts obtained by the left-hand and right-hand sensors L and R (step S21).

The four pre-integration amounts obtained as above are used to select a sensor area that corresponds to the portion of the to-be-shot image, the integration pattern of which has changed between the cases with light projection and without light projection. The selection of the sensor area enables the measurement of a distance to the central main subject 3a in the to-be-shot image shown in FIG. 7, without influenced by the background light.

It is determined at a step S22 whether the following formula is established:

$$A/D\ C2-A/D\ C1 > A/D\ RL2-A/D\ RL1 \qquad (3)$$

If it is determined that A/D C2−A/D C1 is greater (if the answer is Yes), it is assumed that the main subject (person) exists at a substantially central portion of the image area to-be-shot, thereby determining the time required for the main integration on the basis of the pre-integration amount A/D C2 (step S23). In light of the fact that the pre-integration amount A/D C2 has been obtained after the time period t1, the predetermined appropriate level VS can be reached by performing the main integration for a time period given by the following equation (4) that is obtained by modifying the equation (1):

$$t\ INT = t1 \cdot VS/(A/D\ C2) \qquad (4)$$

Since at this time, the effect of the light projection is determined on the basis of the luminance of the to-be-shot image, the light projection is not performed in the main integration, as in the pre-integration, when the luminance is high or medium, but only when it is low.

In other words, the pre-integration operations with and without light projection, employed in this embodiment, also serve to estimate the effect of assisting light at the main integration. FIG. 3A shows the state of the pre-integration.

Before executing the main integration, the charge accumulated in the line sensor during the pre-integration is cleared to initialize the sensor (step S24). After that, the main integration is executed (step S25), whereby ranging is performed on the basis of the integration result.

Further, if it is determined at the step S21 that A/D C2−A/D C1 is smaller (if the answer is No), comparison is executed between the pre-integration amounts (A/D C1) and (A/D RL1) respectively obtained, without light projection, from the central sensor area and the peripheral sensor area (step S26). Then, integration control is performed using the greater integration amount (steps S27 and S28).

Also at this time, the time required for the main integration can be obtained from (A/D C1) and (A/D RL1) as in the case of using the equation (4). However, the time for the main integration is not determined simply based on (A/D RL2), which differs from the case of the step S23.

Figure 4:
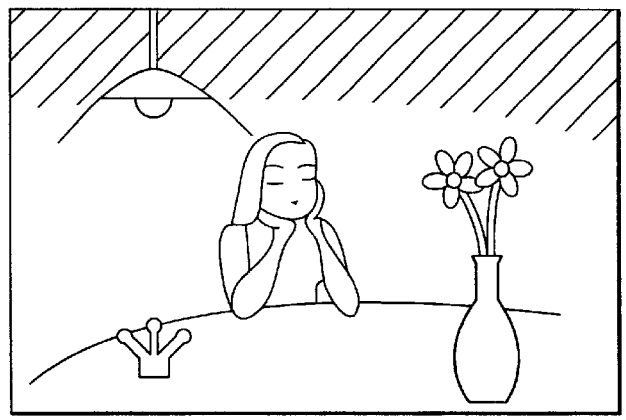
FIG. 4 is a view showing an example of a to-be-shot image.

This is to avoid a case where an object having a luster, such as a crown or a flower base, exists at the portion of the image area to-be-shot which is near to the camera, as is shown in FIG. 4, and light projected onto the object, reflected therefrom, and having entered the left-hand or right-hand sensor L or R during the pre-integration does not indicate an accurate distance thereto.

By virtue of the above structure, the camera can be accurately focused on the person as the main subject of both the to-be-shot images shown in FIGS. 4 and 7.

As described above, in the embodiment, line sensor areas, signals from which are taken during the pre-integration, are limited, and further the position of a peripheral sensor area is adjusted depending upon the size (angular field of view) of the to-be-shot image. Therefore, the camera can be focused on the main subject at a high speed, irrespective of luminance differences between objects situated in an image area to-be-shot or of the state of the background of the main subject.

As described above, the embodiment provides a camera capable of instantly performing focusing wherever a to-be-photographed main subject is situated in an image area to-be-shot. Since the user can confirm, through the viewfinder of the camera, the position in which ranging is performed, they can devote themselves to photographing.

A ranging apparatus according to a second embodiment of the invention will be described.

Although the first embodiment employs a line sensor, a ranging apparatus of a high performance, in which the idea of the invention is applied to an area sensor, can be designed.

As is shown in FIG. 14B, the ranging area 28 of a line sensor occupies a narrow lateral area in a central portion of an image area to-be-shot 30. On the other hand, the area sensor can occupy the almost entire image area to-be-shot 30, as is indicated by reference numeral 29, since it is formed by two-dimensionally arranging a plurality of line sensors.

If, in the conventional ranging apparatus, the user wants to photograph an image as shown in FIG. 14A, they make the main subject (person) be contained in the ranging area (a central portion of the image area to-be-shot) at the time of ranging, thereby performing ranging with the release button half-pushed, shifting the camera with the release button half-pushed to obtain an image that they want to photograph, and fully pushing the release button to perform exposure. Thus, a two-stage operation, a so-called "focus-lock operation", is performed in the conventional ranging apparatus.

This operation is disadvantageous in speedy photography since such a pre-operation as above must be performed before taking a photograph, with the result that moments for good pictures may be missed while searching for a desired moving-subject to-be-shot image.

If in this case, the ranging area is widened using the area sensor, the distance to the main subject can be measured even if it is situated at an end portion of the image area to-be-shot as shown in FIG. 14A.

However, when the technique for enabling the measurement of the distance to the subject situated at an end portion of the image area to-be-shot is used, a technique for detecting the position of the main subject in the image area to-be-shot becomes more important as the number of ranging possible points increases.

Where there are an extremely large number of ranging points, if each ranging point is checked, lots of time is necessary for processing, and a longer time than in the focus-lock technique may be required. This is an opposite effect, and hence the demerit of using the area sensor is not small since the area sensor is more expensive than the line sensor.

Referring now to FIGS. 15A to 15C, the concept of the ranging apparatus, according to the second embodiment, for detecting the position of the main subject at a high speed will be explained.

First, the camera performs, before ranging processing, emission with an angular field of view corresponding to the image area to-be-shot as shown in FIG. 15A. At this time, the distribution of light reflected from a main subject and other objects, having entered the area sensor and corresponding to the distances to them is substantially as shown in FIG. 15B.

As is evident from FIG. 15B, almost no reflection signal is returned from the complicated background since the distance thereto is very far, whereas a reflection signal is returned from the person or the flowers since the distances thereto is not far. As a result, the pattern on the area sensor is a very simple one as shown in FIG. 15B.

The position of the main subject in the image area to-be-shot can be determined by causing the operation control section of the camera to control, using a predetermined sequence of pattern determining operations, the signal indicative of the pattern and expressed in a substantially digitized value.

This idea is similar to that described with reference to FIGS. 8 and 9. The auto-focusing (AF) technique for instantly focusing the camera on a main subject irrespective of the position of the main subject in the image area to-be-shot can be realized by performing ranging using the ranging point determined by the above determination as shown in FIG. 15C.

The ranging system used in this state may be selected, depending upon the situation of photography, from between a so-called active system that uses light for ranging, and a passive system that uses no light for ranging.

Figures 16A, 16B:
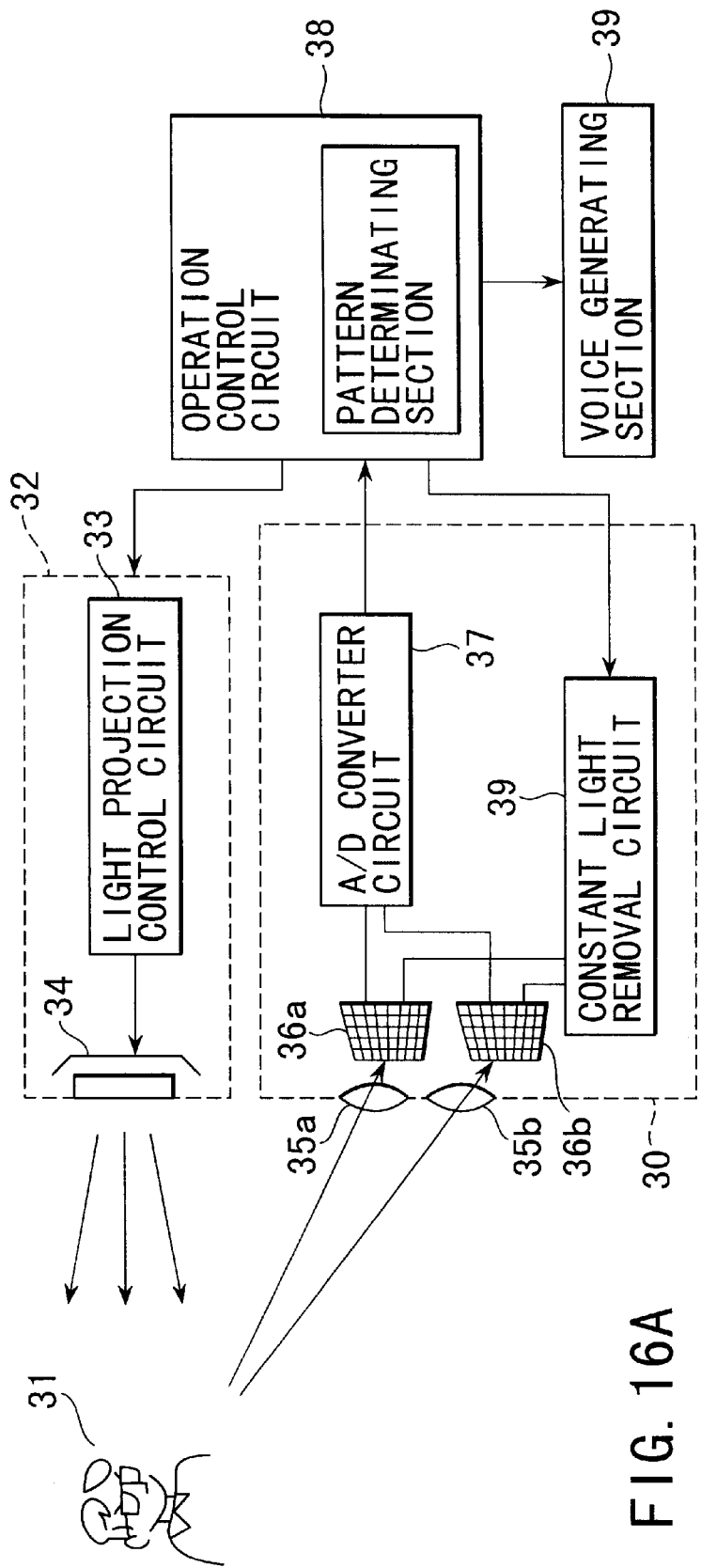
FIG. 16A is a view showing a conceptual structure of the ranging apparatus of the second embodiment.
FIG. 16B is a view showing a pattern of a to-be-photographed subject which enters the area sensor.

Referring to FIGS. 16A and 16B, the structure of the second embodiment will be described.

FIG. 16A is a view useful in explaining how ranging for detecting the position of a subject 31 using pre-emission is executed.

First, a strobe 34 projects assisting light onto the subject 31 under the control of a projection control circuit 33 that is incorporated in a projecting section 32. A signal indicative of light reflected from the subject 31 enters two light receiving lenses 35a and 35b and hence two corresponding area sensors 36a and 36b.

The two area sensors 36a and 36b convert signal components corresponding to the subject into photo-electric signals, which are converted by an A/D converter circuit 37 into digital values corresponding to the pixels of the area sensors. These digital values are input to an operation control section 38.

A constant-light removal circuit 39 is connected to the area sensors 36a and 36b for removing a light signal, which is similar to a DC current signal and constantly enters the sensors, from the image area to-be-shot under the control of the operation control section 38, thereby providing, as an output signal, only pulse light (assisting light) from the strobe 34.

Accordingly, if reflection signal light is made to enter the area sensors 36a and 36b with the constant-light removal circuit 39 operated, an image, the shaded-in area of FIG. 16B, is formed on the area sensors. The patterns of the images on the area sensors are analyzed by software installed in the operation control section 38. If it is determined that the image pattern indicates, for example, a human, the image is considered a main subject.

Figure 17:
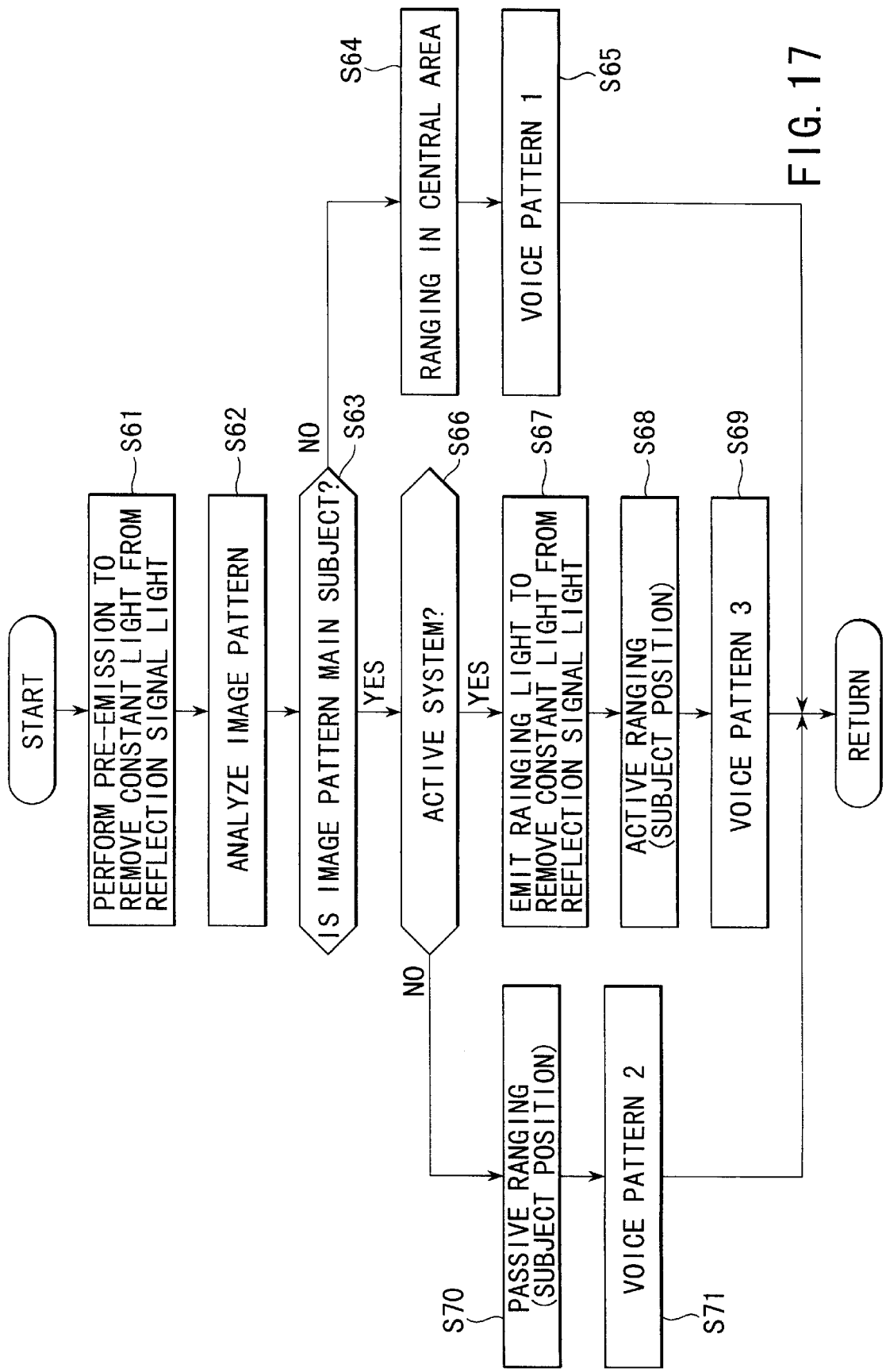
FIG. 17 is a flowchart for explaining ranging performed by the ranging apparatus of the second embodiment.

Referring to the flowchart of FIG. 17, the ranging operation of the ranging apparatus of the second embodiment will be described.

Before executing ranging, the strobe 34 is made to perform pre-emission under the control of the projection control circuit 33 of the projecting section 32, thereby projecting assisting light onto the subject 31, and causing a signal corresponding to light reflected therefrom to enter the area sensors 36a and 36b. At this time, the constant-light removal circuit 39 is operated to remove constant light from reflection signal light that has entered the area sensors 36a and 36b, thereby extracting only an image signal contained in the reflection signal light (step S61).

After that, the image signal is A/D converted by the A/D converter circuit 37, and input to the operation control circuit 38, where the pattern of an image indicated by the image signal and formed on the area sensors 36a and 36b is analyzed by the software (step S62).

It is determined whether or not the analyzed image pattern has, for example, a human configuration and hence indicates a main subject to be photographed (step S63). If it cannot be determined that the image pattern indicates a main subject, i.e. if the position of the main subject cannot be determined (the answer is No.), one of the active system and the passive system is selected on the basis of, for example, luminance information, and then ranging is concentrically executed for a central portion of the image area to-be-shot, in which the main subject exists at a high probability (step S64).

Then, the one of voice signal patterns prestored in the operation control section 38, which indicates that the position of the main subject cannot be determined and hence ranging will be executed for the central portion of the image area to-be-shot, is selected and informs the user by using a voice (a voice pattern 1) output from a voice generating section 40 (step S65).

If, on the other hand, it is determined at the step S63 that the image pattern indicates the main subject (i.e. the answer is Yes), it is determined whether the active system or the passive system should be employed for ranging, depending upon the intensity of the image signal (light signal) corresponding to the image pattern, and upon whether or not the image signal provides a sufficient contrast (step S66).

If it is determined at the step S66 that the image signal (light signal) does not provide a sufficient contrast (i.e. the answer is Yes), ranging is executed using the active system. Accordingly, the projecting section 32 again projects light for ranging onto the subject 31, thereby causing the constant-light removal circuit 39 to remove constant light from the reflection signal light that indicates the image on the area sensors 36a and 36b, and to extract only the image signal contained in the reflection signal light (step S67). After that, ranging using the active system is concentrically executed for the main subject determined by the pre-emission (step S68).

Then, the position of the main subject is determined from the voice signal patterns, and the ranging using the active system is selected, thereby informing the user of this by using a voice (a voice pattern 3) output from the voice generating section 40 (step S69), followed by the program returning to the step S61.

On the other hand, if it is determined at the step S66 that the image signal has a low intensity (the answer is No), ranging using the passive system, in which the already obtained image signal indicating the position of the main subject is concentrically used, is executed (step S70). Then, the position of the main subject is determined from the voice signal patterns, and the ranging using the passive system is selected, thereby informing the user of this by using a voice (a voice pattern 2) output from the voice generating section 40 (step S71), followed by the program returning to the step S61.

In accordance with the selected ranging system or the determination result concerning the position of the main subject, the operation control section 38 selects a voice signal and informs the user of the selection and determination results. Thus, the user can easily know, for example, photography conditions and perform stable ranging.

As described above, in the second embodiment, the active system and the passive system are not simply combined, but the position determination of a main subject can be performed with a high accuracy, using these two systems.

A modification of the second embodiment will now be described.

Data in the viewfinder may be changed, as well as the information using a selected voice pattern as in the above-described embodiment.

Figure 18A:
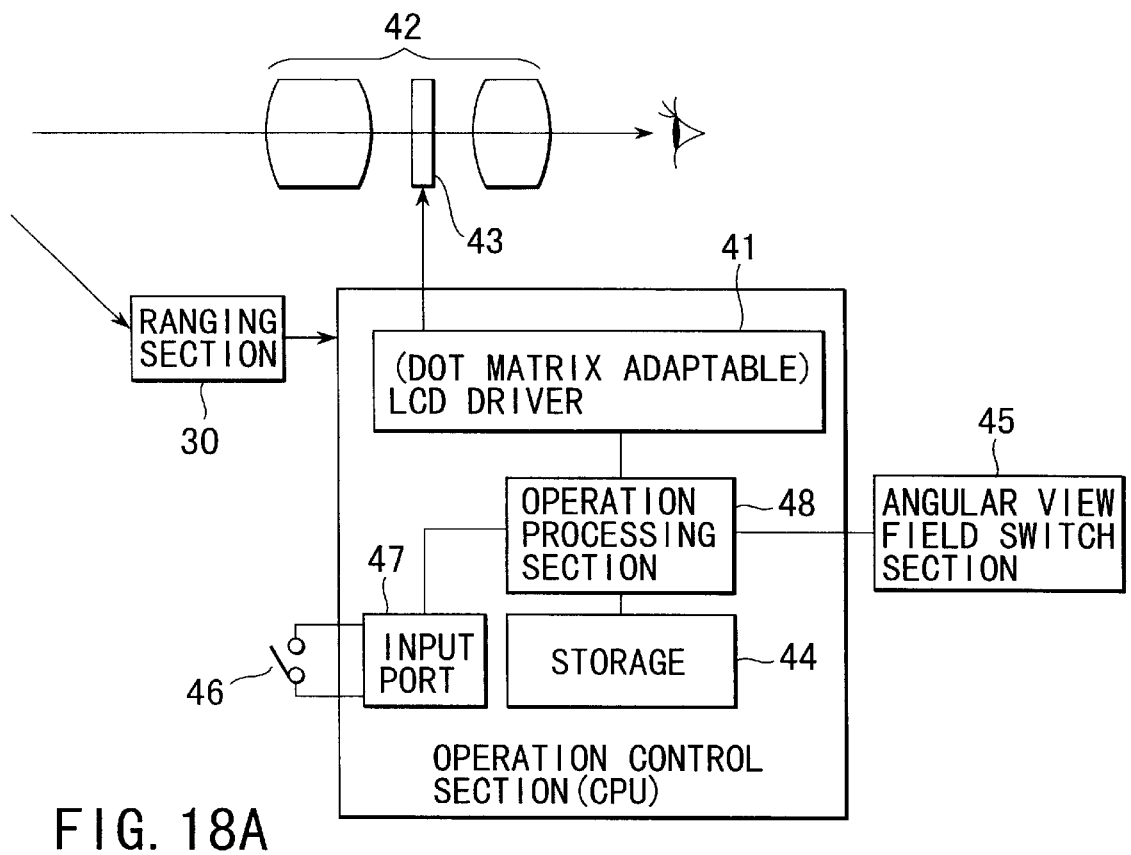
FIG. 18A is a view showing the structure of a modification of the ranging apparatus according to the second embodiment.

As is shown in FIG. 18A, this modification comprises a matrix LCD driver 41 for changing the transmittance of an LCD 43 incorporated in the viewfinder 42, an angular view filed switching section 45 for changing the image area to-be-shot under the control of an operation processing section 48, an input port 47 for receiving a signal from a focus lock switch (a 1st release switch) 46, and a storage 44 for storing software or data to be used for performing processing.

This structure enables the switching and display of the transmittance of the LCD 43 performed in accordance with the ranging result by the matrix LCD driver contained in the operation control section 38, thereby further facilitating the understanding of the user.

Figure 18B:
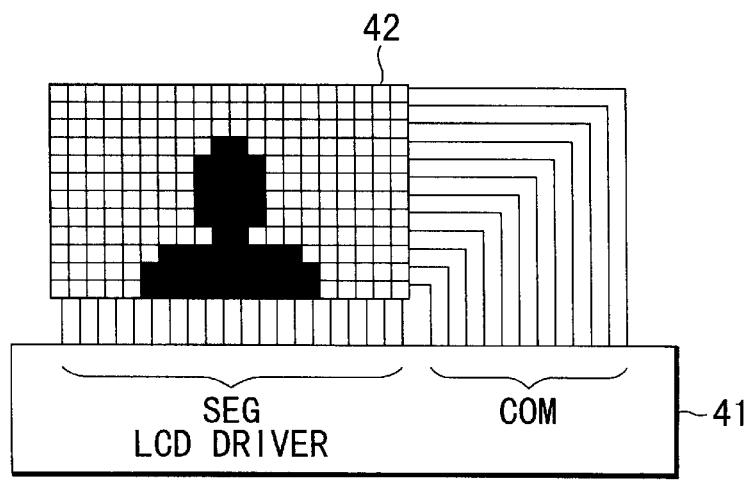
FIG. 18B is a view useful in explaining an LCD driver.
Figure 19:
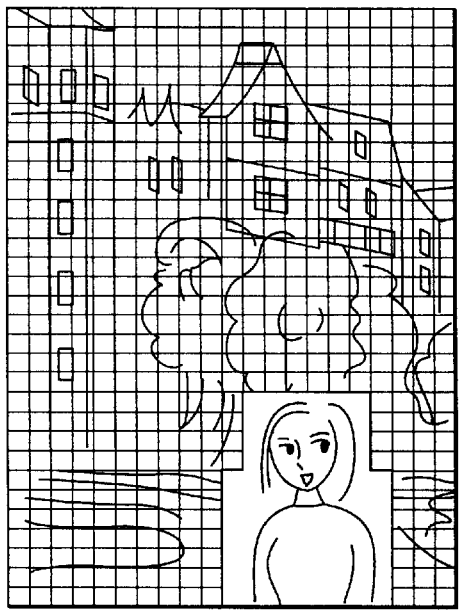
FIG. 19 is a view showing an example in which the ranging point in the to-be-shot image is displayed using a transparent area.

For example, as is shown in FIG. 18B, the LCD driver 41 determines to-be-transmitted portions of the LCD 43 using an image pattern of a subject similar to FIG. 16B, and controls selection signals for selecting the common (COM) and segment (SEG) lines of the LCD 43. As a result, an area in the viewfinder, in which the camera is tried to be focused, can be monitored as shown in FIG. 19. In this case, control is performed so as to determine a transmission area in accordance with an image pattern, and to reduce the transmittance of the LCD 43 in the other areas.

Figure 20:
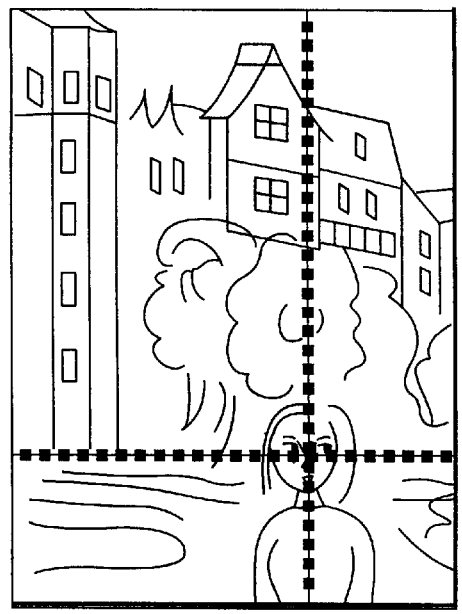
FIG. 20 is a view showing an example in which the ranging point in the to-be-shot image is displayed using a cross mark.

Furthermore, the ranging point may be indicated by the cross mark shown in FIG. 20. In this case, the ranging point is extended in the X- and Y-directions, and those portions of the LCD of the viewfinder, which correspond to the extensions of the ranging point, are made untransmissible.

The user can know whether the camera is operating correctly by confirming such a display as above on the viewfinder.

If the camera performs erroneous display, the detection of a main subject is considered erroneous. In this case, the focus lock operation shown in FIG. 14A may be performed again for re-ranging.

Specifically, the user operates a focus lock switch 46 provided as shown in FIG. 18A. To make the ranging point correspond to the image area to-be-shot, the operation processing section 48 executes calculation for the correspondence on the basis of the ranging result, the angular field of view obtained by the angular view field switching section 45 during the operation of the camera, and displays the calculation result on a LCD display.

Figure 21:
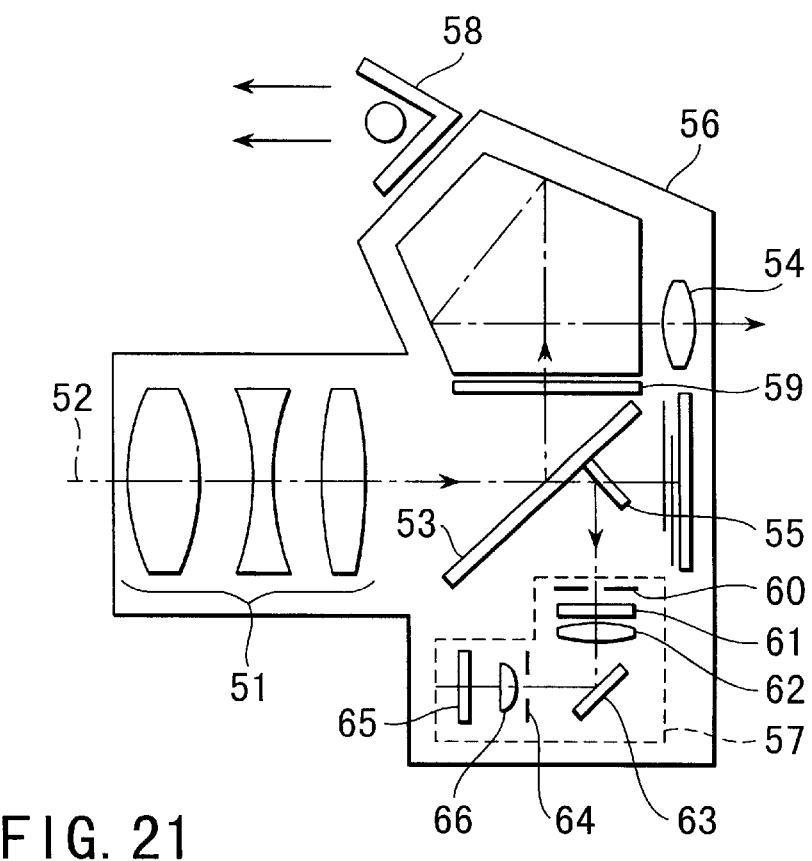
FIG. 21 is a view illustrating an example in which a ranging apparatus according to a third embodiment is applied to a single-lens reflex camera.

FIG. 21 is a cross section of a single-lens reflex camera to which the ranging apparatus of the invention is applied.

A light flux reflected from a to-be-photographed subject and having passed through a photography lens 51 is reflected by and transmitted through a main mirror 53. The light flux reflected by the main mirror 53 is guided to a viewfinder 54, while the light flux transmitted through the main mirror 53 is reflected by a sub mirror 55 and guided to a focus detecting section 57 provided in a lower portion of a camera body 56.

A strobe unit 58 is provided on the camera body 56 and functions as projection means for projecting assisting light used for focus detection. An LCD 59 is located in the viewfinder 54 for displaying the focal position in the image area to-be-shot under the control of an operation control section (not shown) to thereby enable the user to confirm the focal position in the viewfinder 54.

The focus detecting section 57 is adapted to detect a focus using a phase difference detection method, and comprises a view field mask (S mask) 60 for restricting a light flux having passed the photography lens 51, an infrared cut filter 61, a condenser lens (C lens) 62 for converging the light flux, a total reflection mirror 63 for totally reflecting the light flux, a pupil mask 64 for limiting the light flux, an area sensor 65, and an image re-forming lens (S lens) 66 for re-converging the light flux on the area sensor 65.

Figure 22:
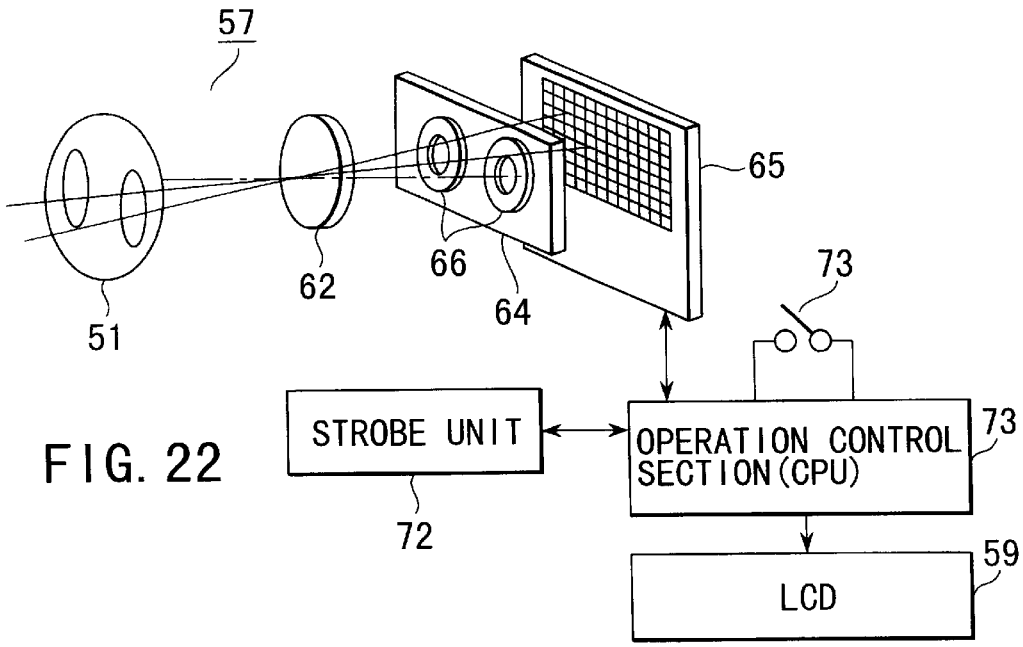
FIG. 22 is a view showing the outward appearance, when viewed obliquely from above, of a focus detecting section incorporated in the apparatus of FIG. 21.

FIG. 22 is a perspective view of the focus detecting section 57. As shown, an S lens 66 for passing therethrough a light flux reflected from a to-be-photographed subject (not shown) is provided behind the pupil mask 64.

An operation control section (CPU) 71 controls the operations of the area sensor 65 and the strobe unit 72. The section 71 starts the integration operation of the area sensor 65, and obtains sensor data at the time of light emission by causing the strobe unit 72 to emit light, or at the time of no light emission. The operation control section 71 reads sensor data from the area sensor to perform the detection of a main subject, the detection of a focus, etc. Moreover, the section (CPU) 71 includes a next-candidate switch 73 which will be described later.

Figure 23:
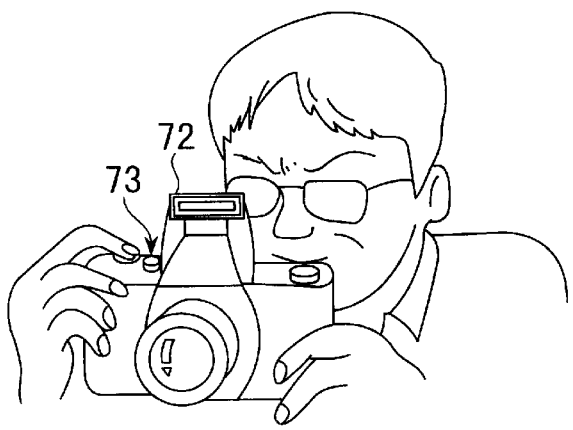
FIG. 23 is a view showing the outward appearance of the single-lens reflex camera of FIG. 21.

FIG. 23 shows the outward appearance of a single-lens reflex camera according to a third embodiment.

Figure 24A:
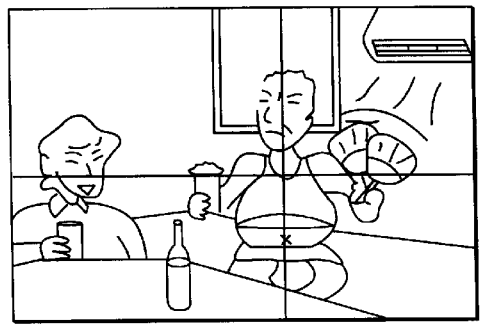
FIGS. 24A, 24B and 24C are views useful in explaining examples in which the subjects, on which a camera with the ranging apparatus of the invention is focused, are switched from one to another.
Figure 24B:
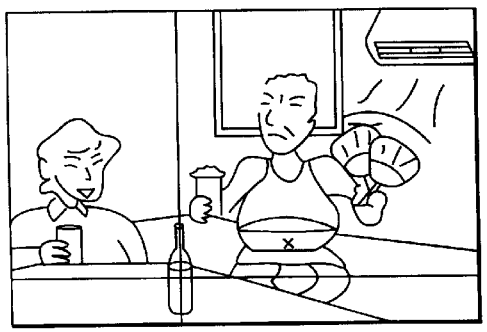
Figure 24C:
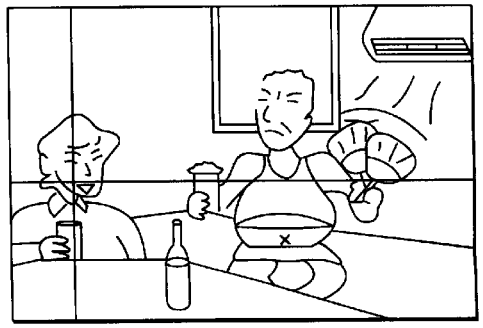

There is a case where even a camera, to which the present invention is applied, cannot determine a main subject in, for example, a complicated to-be-shot image as shown in FIGS. 24A to 24C. Basically, if a pattern corresponding to a person situated in a central position is made to have priority over any other pattern as shown in FIG. 24A, it is highly probable that a good photograph can be taken. However, depending upon the conditions, there may be a case as shown in FIG. 24B where the camera is erroneously focused on the alcohol bottle, or a case as shown in FIG. 24C where the photographer actually wants to focus the camera on the person other than the person situated in the central position.

If in such cases, the next-candidate switch 73 provided in the camera is operated to cause the operation control section 71 to determine the next candidate on which the camera should be focused, and to display it on the LCD 59 of the viewfinder 54, the user will be free from lots of dissatisfaction. When this structure is employed in a single-lens reflex camera, the user can determine on the image area to-be-shot whether or not the camera is correctly focused, which means that they can more easily confirm the focal position and take photographs without fail.

As described above in detail, the invention can provide a ranging apparatus capable of executing correct ranging without the influence of a luminance difference between a main subject and other ones, or without the influence of the background of the main subject, even if the background is, for example, a dark night view.

In addition, the camera that incorporates the ranging apparatus of the invention can realize speedy photography, since a line sensor is used in the ranging apparatus for performing, when the ranging area is substantially the same as the viewfinder area, pre-emission before the ranging operation to determine the position, in the viewfinder area, of a to-be-photographed main subject on which the camera should be focused, thereby making unnecessary the two-stage exposure operation using a focus lock function. Furthermore, when the to-be-shot image is a complicated one that includes a plurality of subjects, any desired subject can be selected as a main subject by an easy operation, and it is not necessary to shift the camera so as to include the main subject in the ranging area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ranging apparatus comprising:
   an integration-type sensor that receives light reflected from a plurality of areas of a to-be-photographed subject situated in a ranging area, and that outputs an image signal;
   a light projecting section that projects light onto the to-be-photographed subject; and
   an operation control section having a first pre-integration operation mode in which the integration-type sensor and the light projecting section are synchronized and operated, and a main integration operation mode in which ranging information is obtained;
   wherein the operation control section sets a specific area selected from the plurality of areas based on operation results of the first pre-integration operation mode to calculate a distance to the to-be-photographed subject based on an image signal obtained from the specific area during the main integration operation mode.

2. An apparatus according to claim 1, wherein the operation control section further includes a second pre-integration operation mode in which only the integration-type sensor is operated, and wherein the operation control section compares the operation results of the first pre-integration operation mode with operation results of the second pre-integration operation mode, and determines, as the specific area, an area in which a level difference between the operation results of the first and second pre-integration operation modes is equal to or greater than a predetermined value.

3. An apparatus according to claim 2, wherein a period of an operation time for each of the first and second pre-integration operation modes is set to be shorter than a period of an operation time for the main integration operation mode.

4. An apparatus according to claim 1, further comprising a monitor that monitors a level of the image signal of the integration-type sensor, and wherein the operation control section controls the operation time of the main integration operation mode based on an output signal from a predetermined area of the monitor which corresponds to said specific area.

5. A ranging apparatus comprising:
   an integration section that integrates a light signal corresponding to an image pattern of a to-be-photographed subject;
   a monitor area setting section that sets a monitor area in which an amount of integration executed by the integration section is monitored;
   a light projecting section that projects assisting light onto the to-be-photographed subject; and
   an operation control section that performs a ranging operation based on an output from the integration section to obtain a distance to the to-be-photographed subject;
   wherein the operation control section includes a first pre-integration mode in which an integrating operation by the integration section is performed in synchronism with a projection operation by the light projecting section, and a main integration mode in which main integration is performed to select the monitor area in accordance with results of the integrating operation performed during the first pre-integration mode and control the monitor area setting section.

6. An apparatus according to claim 5, wherein the operation control section further includes a second pre-integration mode in which an integrating operation is performed without the light projecting section performing the projection operation, and wherein the operation control section selects, during the main integration, an area used in one of the first and second pre-integration modes in which a level difference between operation results is greater, thereby controlling the monitor area setting section.

7. An apparatus according to claim 5, wherein the ranging operation is executed using an image signal output from the set monitor area.

8. An apparatus according to claim 6, wherein a period of an operation time for each of the first and second pre-integration modes is set to be shorter than a period of an operation time for the main integration mode.

9. An apparatus according to claim 5, further comprising a monitor that monitors a level of the amount of integration executed by the integration section, and wherein the monitor operates in synchronism with an angle of view.

10. A ranging apparatus comprising:
    an integration-type sensor that receives light reflected from a plurality of to-be-photographed subjects situated in a central area and peripheral areas of a ranging area, and that outputs image signals corresponding to the subjects;
    a monitor that monitors only an image signal level in a predetermined area of the integration-type sensor;
    a light projecting section that projects light onto the to-be-photographed subjects; and
    an operation control section having a first pre-integration operation mode in which only the integration-type sensor is operated, a second pre-integration operation mode in which the integration-type sensor and the light projection section are synchronized and operated, and a main integration operation mode in which ranging information is obtained;
    wherein the operation control section sets the predetermined area based on operation results of the first and second pre-integration operation modes and performs the main integration operation to calculate a distance to a to-be-photographed main subject among the plurality of to-be-photographed subjects based on an image signal output during the main integration operation.

11. An apparatus according to claim 10, wherein the operation control section compares a level change in the central area with a level change in each peripheral area based on the operation results of the first and second pre-integration operation modes, and sets the central area as the predetermined area if the level change in the central area is greater than the level change in each peripheral area.

* * * * *